United States Patent [19]
Kusser

[11] Patent Number: 6,065,731
[45] Date of Patent: May 23, 2000

[54] BASE BEARING ASSEMBLY FOR BEARING AN UPRIGHT OBJECT

[76] Inventor: Josef Kusser, Renholding 29, 94529 Aicha v. Wald, Germany

[21] Appl. No.: 08/385,356

[22] Filed: Feb. 8, 1995

[30] Foreign Application Priority Data

Apr. 8, 1994 [DE] Germany ............................ 44 12 178

[51] Int. Cl.⁷ .................................................. A47B 91/00
[52] U.S. Cl. ........................................ 248/349.1; 248/425
[58] Field of Search ................................ 248/349.1, 562, 248/566, 636, 178.1, 186.2, 131, 425; 108/20, 21, 22, 94; 384/108, 109, 121, 245

[56] References Cited

U.S. PATENT DOCUMENTS

| | | | |
|---|---|---|---|
| 2,695,199 | 11/1954 | Blizard | 384/109 |
| 3,322,473 | 5/1967 | Lebach | 384/121 |
| 3,537,763 | 11/1970 | Unterberger | 384/108 |
| 3,822,652 | 7/1974 | Burdick et al. | 248/349.1 X |
| 4,728,201 | 3/1988 | Abbe | 384/108 X |
| 5,524,502 | 6/1996 | Osanai | 108/20 X |

FOREIGN PATENT DOCUMENTS

| | | |
|---|---|---|
| 77 28711 | 9/1977 | France . |
| 1232407 | 11/1959 | Germany . |

*Primary Examiner*—Leslie A. Braun
*Assistant Examiner*—Kimberly Wood
*Attorney, Agent, or Firm*—Renner, Otto, Boiselle & Sklar, LLP

[57] ABSTRACT

The invention relates to a base bearing assembly, more particularly a device for bearing an upright object such as e.g. a work of art or a monument having a base and a pedestal arranged on the base, characterized in that the pedestal is borne by a film of liquid floatingly rotatable about a perpendicular axis on the base.

32 Claims, 2 Drawing Sheets

BASE BEARING ASSEMBLY FOR BEARING AN UPRIGHT OBJECT

BACKGROUND OF THE INVENTION

1. Field of the Invention

This invention relates to a base bearing assembly, for bearing an upright object such as e.g. a work of art, a company logo or a monument, of the kind specified in the preamble of claim 1.

2. Description of the Prior Art

Such base bearing assemblies are known in particular as regards monuments or works of art standing for instance in parks, the pedestal actually mounting the object being secured in many cases to a generously dimensioned base to give the object a suitably exposed level in height.

These base bearing assemblies have the drawback, however, that because they are "dead" the objects placed on them often fail to be suitable in exciting the attention of passers-by.

With works of art gaining much attention it is, on the other hand, usually very difficult to view the object from all sides due to the crowd of viewers making it very difficult to gain access from all sides.

SUMMARY OF THE INVENTION

The object of the present invention is to create a base bearing assembly, for bearing an upright object, which overcomes the aforementioned drawbacks, which is particularly suitable for directing attention to the object and to permit it being viewed from all sides even when access is difficult.

This object is achieved by a base bearing assembly which is configured according to the characterizing portion of claim 1.

The advantage of the assembly according to the invention consists particularly in the friction being exceptionally low between the pedestal mounted to rotate about a vertical axis and floating on a liquid film and the base slab. For this reason the pedestal bearing e.g. an object is caused to commence rotation about a vertical axis even when subjected to slight forces, e.g. due to being lightly pushed by a viewer or by any irregularities occurring in the direction of the liquid supply. As a result of this unusual "live" effect for works of art and similar objects the attention of passers-by is directed to the object on show, which would possibly go unnoticed if the object had a "dead" base bearing assembly.

In addition, in a situation where objects are inaccessible either due to a crowd of viewers or due to other circumstances, it is of advantage that every viewer has the possibility of viewing the object on all sides from a single location without having to change his location, simply by the object being caused to rotate.

Expedient embodiments of the base bearing assembly according to the invention are described by the subclaims.

There is the possibility of configuring the assembly according to the invention so that the base has a recess opening towards its upper side to floatingly receive a centering projection protruding from the underside of the pedestal, the recess being provided with at least one supply of pressurized liquid in a gap between the recess and the centering projection.

A further possibility is to configure the base bearing assembly so that the pedestal has a recess opening towards its underside to floatingly receive a centering projection protruding from the upper side of the base, the base being provided with at least one supply of pressurized liquid in a gap between the recess and the centering projection.

Advantageous centering of the pedestal on the base may be assured for these two kinds, the supply of the liquid through the recess preventing undesirable friction effects between the centering projection and the recess.

Preferably the surfaces of the base and the pedestal, which in the absence of a liquid film would come into contact on each other, are ground flat, enabling a gap filled by a film of liquid to be produced and maintained over the full area of these surfaces.

In one aspect of the assembly according to the invention, the centering projection and the recess are each arranged centrally on the pedestal and base respectively so that in mounting an object, whose center of gravity is also intended to be located centrally above the pedestal, a highly consistent distribution of forces is achieved on the film of liquid and no moments excessively weakening the film of liquid result even when the location of the aforementioned center of gravity is off-center.

A circular configuration of the pedestal may contribute towards avoiding unbalance in its rotary movement.

In one preferred embodiment one body at least partly shaped as a spherical calotte is provided as the centering projection and a recess formed at least partly as a spherical calotte is provided to receive the other substantially to a precise fit, whereby the gap between the two spherical calotte-shaped components may be flooded by the film of liquid highly consistently due to its favorable hydrodynamic properties so that a favorable side centering is achieved.

According to an alternative embodiment, one at least partly cylindrically shaped body is provided as the centering projection and a recess formed at least partly cylindrically shaped is provided to receive the other substantially to a precise fit.

Such a design of the recess or centering projection is very simple to produce cost-effectively and offers optimum centering of the pedestal.

According to yet a further aspect of the base bearing assembly according to the invention, the liquid supply is arranged centrally to the axis of rotation of the pedestal in alignment with the recess. By this assembly it may be attained that the centering projection is consistently surrounded by the flow in the recess and that even when the pedestal is loaded highly off-center no heavy constriction of the liquid film occurs.

According to a preferred embodiment the assembly according to the present invention is configured so that the liquid is supplied to the recess in such a way that the jet of liquid emerging therefrom impinges at an angle on a lower surface of the centering projection of the pedestal.

In this way, since the pedestal due to its low friction is very easy to move with the base, it may be assured that rotation of the object being borne together with the pedestal is always consistent, simply by providing an angled assembly of the liquid supply, for example.

In yet a further aspect of an embodiment having a cylindrical centering projection or a cylindrical recess, the jets emerging from the supplies of liquid are oriented at least in part to center the cylindrical centering projection symmetrically on the cylindrical surface thereof.

In this assembly there is the possibility of avoiding contact between the cylindrical surfaces of the recess and the centering projection even in the presence of strong side forces.

The liquid supply may advantageously comprise at least one hole in the base to permit cost-effective and simple production of such a supply.

On the other hand there is the possibility for forming the liquid supply by providing at least one tube in the base which in turn affords advantages in the maintenance of such supplies, such as e.g. simple replacement of defective tubing.

In accordance with a further preferred aspect, the base bearing assembly according to the invention is characterized by at least two nozzles being provided in the upper ends of the tubes or holes, the emerging jets of liquid of which are directed at an angle to each other as well as each of the two being oriented at an angle against one surface of the centering projection or the recess, there existing the additional possibility of providing the liquid supply of each nozzle with a shutoff valve and controlling the shutoff valves via a common switching assembly so that they alternately open and close.

By means of the above possible aspects an assembly may be achieved in which the pedestal together with the object borne by it is rotated in differing directions depending on the control.

This may also be achieved by providing a tube or a hole of the liquid supply at its upper end with an intermittently swivable nozzle so that at the same time a weakening of the base due to a largish number of holes may be avoided.

The pedestal of the assembly according to the invention is preferably provided with a means of securing an object to be borne.

The liquid supply through the holes or tubes in the recess may preferably be made by a pump which pumps the liquid from a reservoir under pressure into the tubes or holes and thus into the recess.

It is of advantage to characterize the base bearing assembly by providing the pedestal with at least one through-hole through which liquid is able to access from its underside to its upper side where it emerges, the assembly thereby being used as a fountain which, since water is mostly employed as the liquid, may be easily achieved with little complication in design.

Furthermore, the assembly in this employment may be configured in such a way that an opening of a through-hole is arranged on the upper side of the pedestal so that the direction of the force resulting from the emerging liquid fails to pass through the axis of rotation of the pedestal, resulting in a moment about the axis of rotation. In this way the pedestal is furnished with a continuous rotary drive without any further design means being necessary to produce the rotation.

BRIEF DESCRIPTION OF THE DRAWINGS

The base bearing assembly according to the invention with special mention of a device for bearing an upright standing object will be better understood by reference to the following descriptive disclosure when considered in conjunction with the accompanying drawings in which.

DESCRIPTION OF THE PREFERRED EMBODIMENTS

Figure 1:
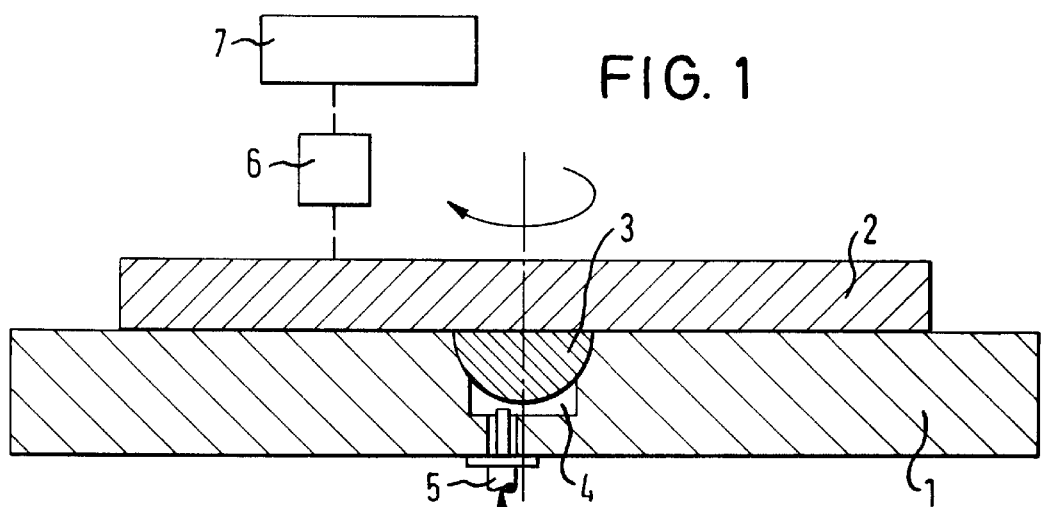
FIG. 1 is a center section through an assembly according to the invention.
Figure 2:
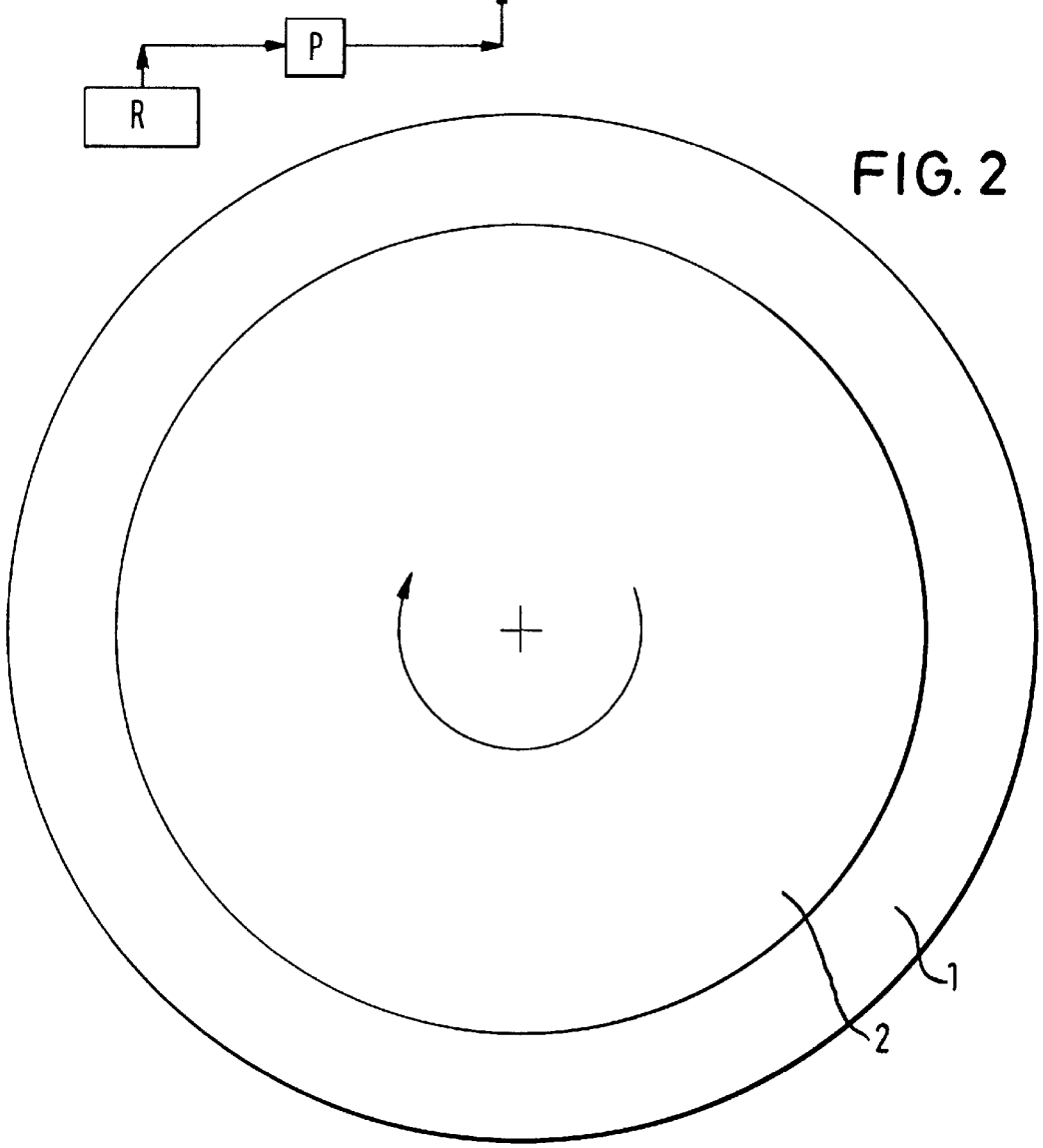
FIG. 2 is a plan view of the embodiment illustrated in FIG. 1.

The plan view and the center section as shown in the FIGS. 1 and 2 illustrate the assembly of the base 1 and the pedestal 2, of the base bearing assembly according to the invention.

It is evident from the center section shown at the top that the pedestal is located by its flat ground lower surface on the upper surface of the base 1 which is also ground flat. Centrally located in the middle of the pedestal 2 a centering projection 3 is formed on the underside thereof which in this example embodiment has a spherical calotte-shaped configuration. This centering projection 3 is received by a recess in the upper side of the base 1 which in its upper region is also configured spherically calotte-shaped precisely to fit the centering projection 3, whilst in its lower region a cylindrical space remains for receiving the liquid to be supplied.

Merging in this space of the recess 4 and extending from the underside of the base 1 is a liquid supply 5 which is here shown as a tube of reducing cross-section inserted in a hole.

The liquid supply may be connected via a pump P to a reservoir R for the liquid, preferably water.

By starting the pump P, the liquid is pumped from the reservoir R under pressure through the liquid supply 5 into the vacant space of the recess 4 until the pressure has sufficiently accumulated in the recess 4 to lift the pedestal 2 together with the object standing thereon (not shown) until the liquid is able to flow through the gap formed between the spherical calotte-shaped bodies and between the surfaces of the base 1 and pedestal 2 facing each other, it thereby forming a thin film of liquid.

By a specific pressure being maintained and regulated by the pump P it is assured that a consistent film of liquid is maintained everywhere between the surfaces of the base and pedestal 2 as well as between the surfaces of the recess 4 and the centering projection 3, i.e. that a stable condition prevails in which the pedestal is borne practically frictionlessly by the base.

The pedestal 2 is preferably provided with a means of securing 6 an object 7 to be borne, as shown diagrammatically in FIG. 1.

Figure 3:
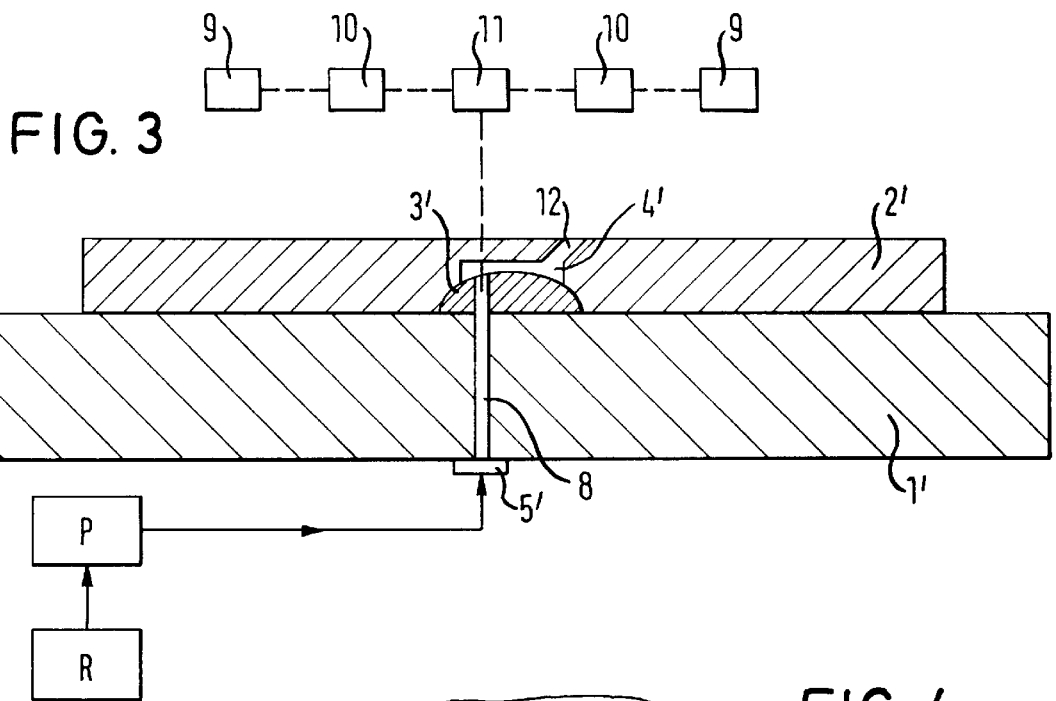
FIG. 3 is a center section of an alternative embodiment of the invention.
Figure 4:
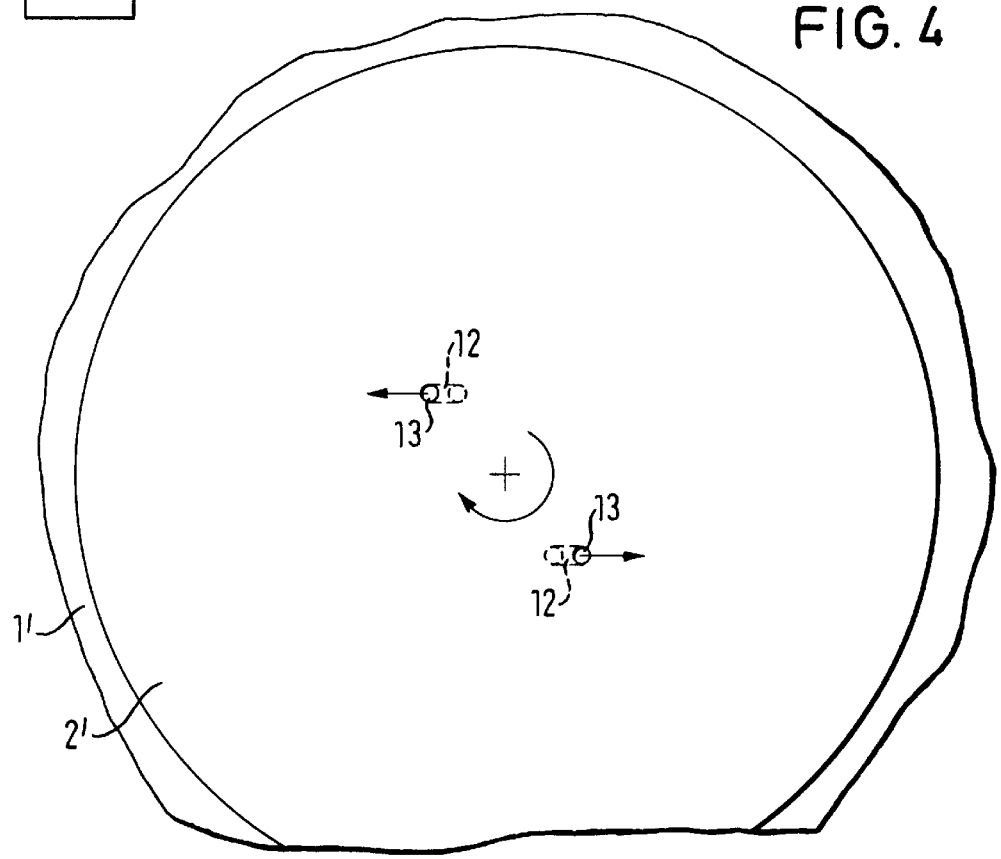
FIG. 4 is a partial plan view of the embodiment illustrated in FIG. 3.

Regarding FIGS. 3 and 4, the assembly according to the invention is illustrated so that the pedestal 2' has a recess 4' opening towards its underside to floatingly receive a centering projection 3' protruding from the upper side of the base 1', the base 1' being provided with a supply 5' of pressurized liquid in a gap between the recess 4' and the centering projection 3'.

The liquid supply 5' is provided by a hole 8 in the base 1' to permit cost-effective and simple production of such a supply.

Two nozzles 9, as diagrammatically shown, are provided in the upper end of the hole, the emerging jets of liquid of which are directed at an angle to each other as well as each of the two being oriented at an angle against one surface of the centering projection 3'. The liquid supply 5' of each nozzle 9 is provided with a shutoff valve 10, as diagrammatically shown, and the shutoff valves 10 are controlled by a common switching assembly 11, as diagrammatically shown, so that they alternately open and close.

The pedestal 2' has two through-holes 12 through which liquid is able to access from its underside to its upper side where it emerges, the direction of force resulting from the liquid emerging from the opening 13 fails to pass through the axis of rotation of the pedestal, resulting in a moment about the axis of rotation. In this way the pedestal 2' is furnished with a continuous rotary drive without any further design means being necessary to produce the rotation.

In the inlet flow perpendicular from the bottom, as shown, no rotary movement of the pedestal 2 is caused. By directing the inlet flow at an angle, e.g. from a plurality of nozzles, a rotary movement may also be produced, however, so that pushing the pedestal 2 manually is no longer needed to rotate the pedestal.

What is claimed is:

1. A base bearing assembly for bearing an upright ornamental object comprising
   a) a base, and
   b) a pedestal arranged on said base, characterized in that
   c) said pedestal is borne by a film of liquid receiving to the same degree the vertical and horizontal forces acting on said pedestal, floating rotatable about a perpendicular axis on said base, and
   d) said pedestal has a centering projection protruding from its underside and an annular bottom surface surrounding said centering projection, said base has a recess opening towards its upper side to floatingly receive said centering projection, said base having an annular top surface surrounding said recess in opposition to said bottom surface of said pedestal and said recess is provided with at least one supply of pressurized liquid in a gap between said recess and said centering projection to form the film of liquid therebetween, and between said bottom surface of said pedestal and said top surface of said base.

2. The base bearing assembly according to claim 1, characterized in that the absence of the film of liquid the surfaces of said base and said pedestal come into contact without an open space between them.

3. The base bearing assembly according to claim 2, characterized in that said centering projection and said recess are each arranged centrally on said pedestal and said base, respectively.

4. The base bearing assembly according to claim 3, characterized in that said pedestal is configured in the shape of circular disk.

5. The base bearing assembly according to claim 4, characterized in that one at least partly cylindrically shaped body is provided as the centering projection and the recess formed at least partly cylindrically shaped, or one body at least partly in the shape of a spherical calotte is provided as said centering projection and the recess formed at least partly as a spherical calotte is provided to receive the other substantially to a precise fit.

6. The base bearing assembly according to claim 5, characterized in that said liquid supply is arranged centrally to the axis of rotation of said pedestal in alignment with said base.

7. The base bearing assembly according to claim 6, characterized in that said pedestal is provided in its upper area with a means of securing an object to be borne.

8. The base bearing assembly according to claim 7, characterized in that said pedestal is provided with at least one through-hole through which liquid is able to access from its underside to its upper side where it emerges.

9. The base bearing assembly according to claim 8, characterized in that an opening of a through-hole is arranged on the upper side of said pedestal so that the direction of the force resulting from the emerging liquid fails to pass through the axis of rotation of said pedestal, resulting in a moment about the axis of rotation.

10. The base bearing assembly according to claim 9, characterized in that said liquid supply is arranged in said base in such a way that the jet of liquid emerging therefrom impinges at an angle on the lower surface of said pedestal.

11. The base bearing assembly according to claim 10, characterized in that the jets emerging from the supplies of liquid are oriented at least in part to center said cylindrical centering projection symmetrically on the cylindrical surface thereof.

12. The base bearing assembly according to claim 11, characterized in that said liquid supply comprises at least one hole or at least one tube in said base.

13. The base bearing assembly according to claim 12, characterized in that at least two nozzles are provided in the upper ends of said tubes or holes, the emerging jets of liquid of which are directed at an angle to each other as well as each of the two being oriented at an angle against one surface of said pedestal.

14. The base bearing assembly according to claim 13, characterized in that said liquid supply of each nozzle is provided with a shutoff valve and that said shutoff valves are controllable via a common switching assembly so that they alternately open and close.

15. The base bearing assembly according to claim 12, characterized in that at least one tube or one hole is provided at its upper end with an intermittently swivable nozzle.

16. A base bearing assembly for bearing an upright ornamental object comprising
   a) a base, and
   b) a pedestal arranged on said base, characterized in that
   c) said pedestal is borne by a film of liquid receiving to the same degree the vertical and horizontal forces acting on said pedestal, floatingly rotatable about a perpendicular axis on said base, and
   d) said base has a centering projection protruding from its upper side and an annular top surface surrounding said centering projection, said pedestal has a recess opening towards its underside to floatingly receive said centering projection, said pedestal has an annular bottom surface surrounding said recess in opposition to said top surface of said base and said recess is provided with at least one supply of pressurized liquid in a gap between said recess and said centering projection to form the film of liquid therebetween, and between said bottom surface of said pedestal and said top surface of said base.

17. The base bearing assembly according to claim 16, characterized in that the absence of the film of liquid the surfaces of said base and said pedestal come into contact without an open space between them.

18. The base bearing assembly according to claim 17, characterized in that said centering projection and said recess are each arranged centrally on base and pedestal respectively.

19. The base bearing assembly according to claim 18, characterized in that said pedestal is configured in the shape of circular disk.

20. The base bearing assembly according to claim 19, characterized in that one at least partly cylindrically shaped body is provided as the centering projection and a recess formed at least partly cylindrically shaped is provided to receive the other substantially to a precise fit, or one body at least partly in the shape of a spherical calotte is provided as said centering projection and a recess formed at least partly as a spherical calotte is provided to receive the other substantially to a precise fit.

21. The base bearing assembly according to claim 20, characterized in that said liquid supply is arranged centrally to the axis of rotation of said pedestal in alignment with said base.

22. The base bearing assembly according to claim 21, characterized in that said pedestal is provided in its upper area with a means of securing an object to be borne.

23. The base bearing assembly according to claim 22, characterized in that said pedestal is provided with at least one through-hole through which liquid is able to access from its underside to its upper side where it emerges.

24. The base bearing assembly according to claim 23, characterized in that an opening of a through-hole is arranged on the upper side of said pedestal so that the direction of the force resulting from the emerging liquid fails to pass through the axis of rotation of said pedestal, resulting in a moment about the axis of rotation.

25. The base bearing assembly according to claim 24, characterized in that said liquid-supply is arranged in said base in such a way that the jet of liquid emerging therefrom impinges at an angle on the lower surface of said pedestal.

26. The base bearing assembly according to claim 25, characterized in that the jets emerging from the supplies of liquid are oriented at least in part to center said cylindrical centering projection symmetrically on the cylindrical surface thereof.

27. The base bearing assembly according to claim 26, characterized in that said supply comprises at least one hole or at least one tube in said base.

28. The base bearing assembly according to claim 27, characterized in that at least two nozzles are provided in the upper ends of said tubes or holes, the emerging jets of liquid of which are directed at an angle to each other as well as each of the two being oriented at an angle against one surface of said pedestal.

29. The base bearing assembly according to claim 28, characterized in that said liquid supply of each nozzle is provided with a shutoff valve and that said shutoff valves are controllable via a common switching assembly so that they alternately open and close.

30. The base bearing assembly according to claim 27, characterized in that at least one tube or one hole is provided at its upper end with an intermittently swivable nozzle.

31. A base bearing assembly for bearing an upright ornamental object comprising a) a base and b) a pedestal arranged on said base, characterized in that c) said pedestal has a centering projection protruding from its underside, said base has a recess opening towards its upper side to floatingly receive said centering projection, said recess being provided with at least one supply of pressurized liquid in a gap between said recess and said centering projection for supplying liquid to form a film of liquid upon which the pedestal is floatingly and rotatably supported and which film of liquid bears both vertical and horizontal forces acting on said pedestal, and said pedestal being provided with at least one through-hole through which liquid is able to flow from the underside of the pedestal to its upper side where the liquid emerges from the through-hole.

32. A base bearing assembly for bearing an upright ornamental object comprising a) a base and b) a pedestal arranged on said base, characterized in that c) said base has a centering projection protruding from its upper side, said pedestal has a recess opening towards its underside to floatingly receive said centering projection, said recess being provided with at least one supply of pressurized liquid in a gap between said recess and said centering projection for supplying liquid to form a film of liquid upon which the pedestal is floatingly and rotatably supported and which film of liquid bears both vertical and horizontal forces acting on said pedestal, and said pedestal being provided with at least one through-hole through which liquid is able to flow from the underside of the pedestal to its upper side where the liquid emerges from the through-hole.

* * * * *